US008595567B2

(12) United States Patent
Richardson et al.

(10) Patent No.: US 8,595,567 B2
(45) Date of Patent: Nov. 26, 2013

(54) METHOD AND SYSTEM FOR SPINLOCK FAULT RECOVERY

(75) Inventors: Raymond Richardson, Richmond, CA (US); Gregory Stults, Berkeley, CA (US)

(73) Assignee: Wind River Systems, Inc., Alameda, CA (US)

(*) Notice: Subject to any disclaimer, the term of this patent is extended or adjusted under 35 U.S.C. 154(b) by 385 days.

(21) Appl. No.: 12/969,786

(22) Filed: Dec. 16, 2010

(65) Prior Publication Data
US 2012/0159242 A1 Jun. 21, 2012

(51) Int. Cl.
*G06F 11/00* (2006.01)
(52) U.S. Cl.
USPC ................................ 714/55; 714/10; 714/12
(58) Field of Classification Search
USPC ................................................ 714/10, 12, 55
See application file for complete search history.

(56) References Cited

U.S. PATENT DOCUMENTS

| 4,604,694 | A | * | 8/1986 | Hough | 710/200 |
| 5,815,651 | A | * | 9/1998 | Litt | 714/10 |
| 5,924,122 | A | * | 7/1999 | Cardoza et al. | 711/150 |
| 6,567,873 | B1 | * | 5/2003 | Henriksen | 710/240 |
| 6,845,417 | B2 | * | 1/2005 | Kauffman et al. | 710/116 |
| 7,162,666 | B2 | * | 1/2007 | Bono | 714/51 |
| 7,383,368 | B2 | * | 6/2008 | Schopp | 710/200 |
| 7,921,272 | B2 | * | 4/2011 | Sarkar et al. | 711/168 |
| 8,055,855 | B2 | * | 11/2011 | Sarkar et al. | 711/150 |
| 2005/0223302 | A1 | * | 10/2005 | Bono | 714/55 |
| 2007/0050527 | A1 | * | 3/2007 | Tuan | 710/200 |
| 2008/0098180 | A1 | * | 4/2008 | Larson et al. | 711/150 |
| 2008/0235690 | A1 | * | 9/2008 | Ang et al. | 718/102 |
| 2008/0294648 | A1 | * | 11/2008 | Lin et al. | 707/10 |
| 2011/0296028 | A1 | * | 12/2011 | Sasaoka | 709/226 |

* cited by examiner

*Primary Examiner* — Joshua P Lottich
(74) *Attorney, Agent, or Firm* — Fay Kaplun & Marcin, LLP

(57) ABSTRACT

A method including requesting access to a resource governed by a spinlock; determining an allocation of the resource to a further requester; determining an expiration of a time limit for the spinlock, if the resource is allocated to the further requester; and initiating a fault recovery, if the time limit is expired.

18 Claims, 3 Drawing Sheets

METHOD AND SYSTEM FOR SPINLOCK FAULT RECOVERY

BACKGROUND

Computing systems may use spinlocks to control access to resources having limited capacity. Spinlocks may ensure that one taker is granted exclusive access to the resource while subsequent takers wait until the resource becomes available in order that they may subsequently be granted access. However, if a taker experiences a failure while accessing a spinlock-controlled resource, the spinlock may be unable to grant access to subsequent takers.

SUMMARY OF THE INVENTION

A method includes requesting access to a resource governed by a spinlock; determining an allocation of the resource to a further requester; determining an expiration of a time limit for the spinlock, if the resource is allocated to the further requester; and initiating a fault recovery, if the time limit is expired.

A system includes a resource, a spinlock governing access to the resource, and a plurality of takers for accessing the resource. When a first taker requests access to the resource, the first taker determines whether a second taker is using the resource; determines, if the second taker is using the resource, whether a time limit relating to the spinlock has been exceeded; and initiates a fault recovery, if the time limit has been exceeded.

A non-transitory computer-readable storage medium stores a set of instructions executable by a processor. The set of instructions is operable to request access to a resource governed by a spinlock; determine an allocation of the resource to a further requester; determine an expiration of a time limit for the spinlock, if the resource is allocated to the further requester; and initiate a fault recovery, if the time limit is expired.

DETAILED DESCRIPTION

Figure 1:
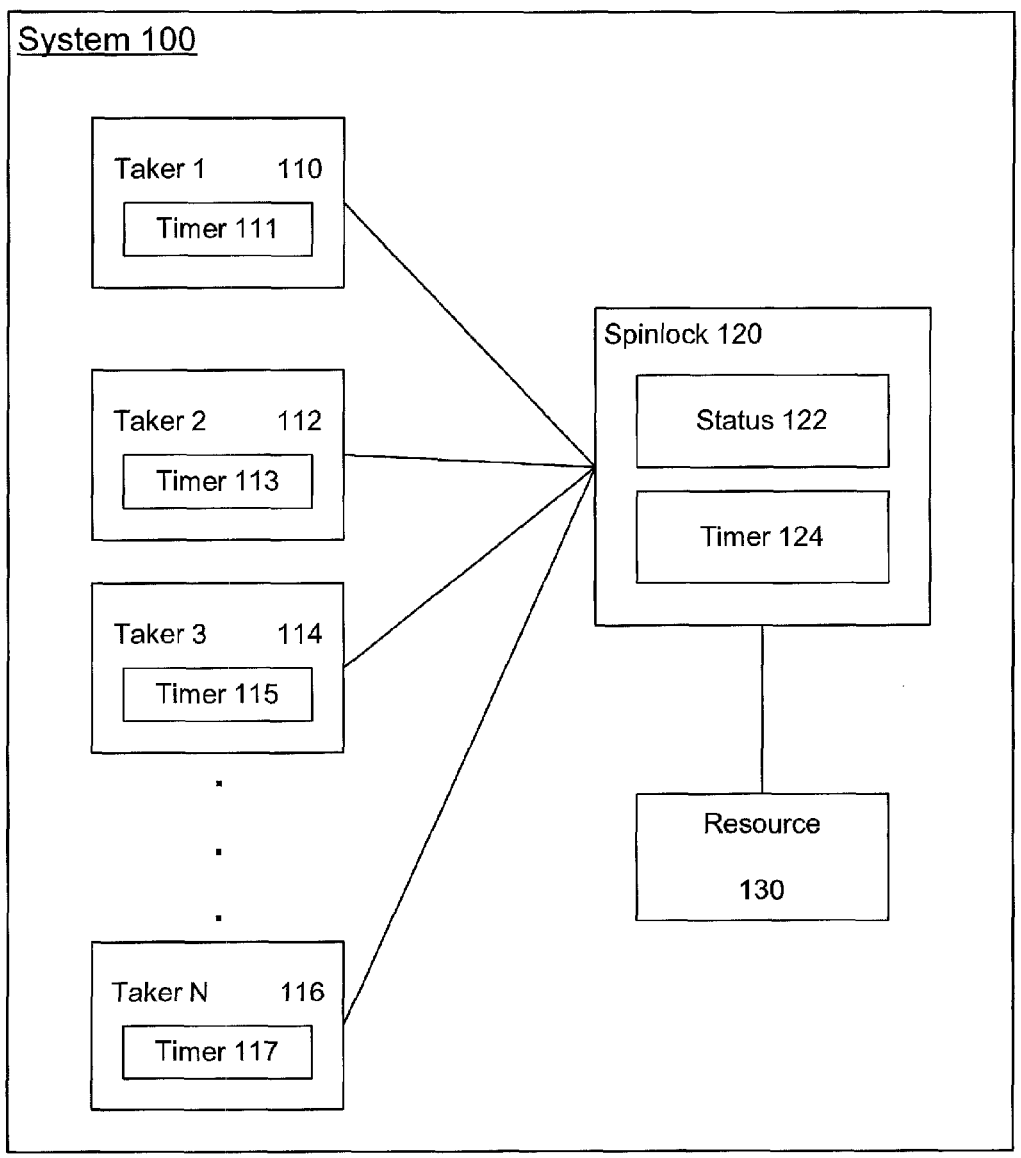
FIG. 1 shows an exemplary system including an exemplary fault recoverable spinlock.

The exemplary embodiments of the present invention may be further understood with reference to the following description and the appended drawings, wherein like elements are referred to with the same reference numerals. The exemplary embodiments describe methods and systems for providing fault recovery for a taker of a spinlock, which may be initiated by a further of the spinlock.

Various computing systems may use spinlocks to control access by multiple entities to resources having limited capacity. Entities accessing resources in such systems may include, but are not limited to, multiple processors within a symmetric multiprocessing or asymmetric multiprocessing system, multiple processing threads within a single operating environment, multiple systems within a distributed computing array, etc. All such entities will be generically referred to herein as "takers" of resources. Controlled resources may include storage media (e.g., magnetic drives, optical drives), volatile memory, excess processing capacity, networking equipment, or any other type of resource that may be accessed by multiple takers for multiple purposes and may not be capable of serving all takers simultaneously.

When a taker attempts to access the resource governed by a spinlock, access is accomplished via the spinlock, which may be, for example, a computing routine comprising code embodying the policies of the spinlock. If a taker sends a request to the spinlock and the resource is not allocated to a prior taker, then the requesting taker is granted access to the resource. In such cases, access to the resource is exclusive to the requesting taker until the taker releases the lock. Conversely, if the resource is already allocated to a prior taker, then the requesting taker may wait, or "spin", until the resource is no longer allocated to the prior taker. In one exemplary embodiment, the requesting taker may wait for a period of time (e.g., predetermined, user-configurable, etc.) and may then attempt to access the locked resource again; while spinning, the requesting taker may perform other tasks that may not require access to the locked resource.

However, due to various circumstances, a taker that has been granted access to a resource may experience a failure that may cause its operations to terminate; the precise nature of the failure may depend on the nature of the taker, but factors causing such failures and the results of such failures may be well known in the art. In such situations, among other results, the taker may not release the spinlock, preventing other takers from accessing the resource in due course. This lack of access may last for an indeterminate amount of time until discovered, thus significantly slowing the progress of tasks to be accomplished by the other, non-failed takers. To remedy this, the exemplary embodiments present methods and systems by which such failures may be detected by subsequent takers that attempt to access the resource, by which a single taker may be determined from among multiple subsequent takers to remedy the failure, and by which the failure may be remedied in order that normal access to the locked resource may commence.

FIG. 1 illustrates a schematic view of an exemplary system 100. The system 100 includes a plurality of N takers 110, 112, 114 and 116; N may be any number greater than or equal to 2, with no upper limit. Each of the takers may include a corresponding timer 111, 113, 115 and 117; the operation of the timers will be described below. The takers 110, 112, 114 and 116 may communicate with a spinlock 120 in order to access a resource 130. At any given time, the spinlock 120 may have a status 122, which will be discussed in further detail below. The spinlock may also have a timer 124, which will also be discussed in further detail below. As described above, the takers 110, 112, 114 and 116 may be any type of taker that may require access to a resource 130 of limited capacity, and the resource 130 may be any type of limited-capacity resource to which it may be preferable to govern access in this manner. Those of skill in the art will understand that FIG. 1 presents a simplified illustration of the system 100, which may include numerous further components (e.g., processing, active memory, storage, user interface, network interface, etc.) that are not shown for purposes of clarity.

Figure 2:
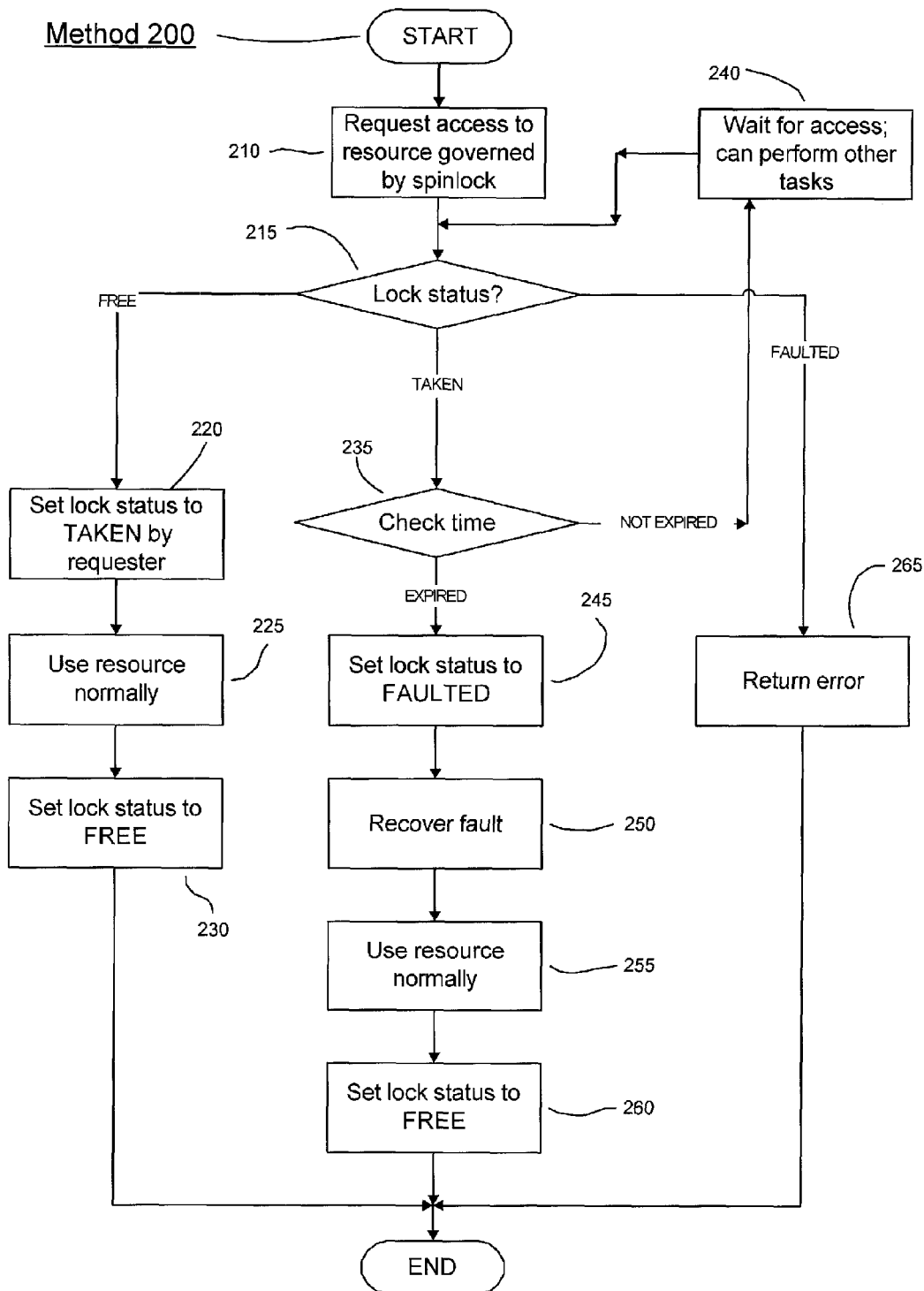
FIG. 2 shows an exemplary method for accomplishing spinlock fault recovery.

FIG. 2 illustrates an exemplary method 200 by which a taker may attempt to access a resource via a spinlock; the method 200 will be described with reference to the elements of the exemplary system 100 of FIG. 1, but those of skill in the art will understand that the broader principles described herein are equally applicable to various other systems. In step 210, a taker (e.g., taker 110) requests access to a locked resource (e.g., resource 130) governed by a spinlock (e.g., spinlock 120). The precise form of the request may be specific to the nature of the taker 110. In step 215, the taker 110 determines the status 122 of the spinlock 120. An exemplary spinlock 120 may have various statuses indicating whether it is FREE, TAKEN or FAULTED. When the spinlock 120 is TAKEN, the status 122 may further indicate the identity of the taker that currently has access to the resource 130. In one embodiment, the status 122 may simply take the form of an integer variable; in such an embodiment, the status 122 may be 0 to indicate that the status 122 is FREE, −1 to indicate that the status 122 is FAULTED, or a positive integer to indicate that the status 122 is TAKEN, with the value of the positive integer revealing the identity of the taker. For example, if the status 122 is 1, this may indicate that the resource 130 is being accessed by taker 1 110; if the status 122 is 2, this may indicate that the resource 130 is being accessed by taker 2 112; etc.

If, in step 215, the taker 110 determines that the status 122 is FREE, then the taker 110 may access the resource. In step 220, the taker 110 changes the status 122 of the lock 120 to TAKEN, with the TAKEN status indicating that taker 110 is the taker having access to the resource 130. Continuing with the exemplary status 122 described above, this may mean that the taker 110 changes the status 122 variable from 0, indicating FREE, to 1, indicating TAKEN by taker 1 110. Next, in step 225, the taker 110 uses the resource 130 normally; it will be apparent to those of skill in the art that the nature of this use will depend on the nature of the taker 110 and the resource 130, and that the details of this use are outside the scope of the exemplary embodiments. After using the resource 130, in step 230 the taker 110 returns the status 122 to FREE; continuing with the example described above, this may mean changing the status 122 variable from 1 back to 0. After this step, the method 200 terminates.

If, in step 215, the taker 110 determines that the status 122 is TAKEN by a prior taker, then, in step 235, the taker 110 initiates its timer 111, which it may use to determine whether the status 122 has been TAKEN by a prior taker for longer than a time limit. The time limit may be predetermined, user-configurable, etc. The time limit may be stored in the spinlock 120 or elsewhere in the system 100. Expiration of the time limit may indicate to the taker 110 that the prior taker has experienced a failure, as described above. In a preferred embodiment, the time limit may therefore be long enough that its expiration may be clearly indicative of a failure, rather than just a delay on the part of the prior taker. The timer 111 may accomplish this task in a variety of ways. In one embodiment, the timer 111 may count upwards starting at zero and may indicate an amount of time during which the taker 110 has been waiting while the status 122 has been TAKEN. In another embodiment, the timer 111 may start at a time limit and count downwards, indicating that a time limit has expired once the time reaches zero. In a further embodiment, the timer 124 of the spinlock 120 may indicate a timestamp at which the prior taker set the status 122 to TAKEN, and the taker 110 may compare the timestamp to a current time indicated by its timer 111 order to determine the amount of time that the status 122 has been set to TAKEN, and whether the time limit has been exceeded.

If the timer 111 indicates that the time limit has not been exceeded, then the method continues in step 240, in which the taker 110 waits, or "spins", while the spinlock 120 remains occupied. In the exemplary embodiment, the taker 110 may perform other tasks in the interim; in other implementations, the taker 110 may be unable to perform other tasks and may simply spin while waiting to re-check the status of the spinlock 120. Subsequently, the taker 110 returns to step 215 and re-checks the status 122 of the spinlock 120.

However, if the timer 111 indicates that the time limit is expired, then the taker 110 may determine that the prior taker has experienced a failure. In step 245, the taker 110 changes the status 122 from TAKEN to FAULTED. Continuing with the values of the status 122 described above, this may involve changing a variable of the status 122 from a positive integer to −1. Changing the status 122 to FAULTED may indicate to subsequent takers that a fault has been discovered and is being remedied. Next, in step 250 the taker 110 initiates recovery of the fault. The TAKEN status discovered in step 215 may indicate to the taker 110 the identity of the prior taker that has experienced a failure. Depending on the nature of the takers, fault recovery may involve terminating and restarting a processing thread, restarting a processor, etc. The precise step or steps to be undertaken are outside the scope of the exemplary embodiments.

After performing fault recovery, in step 255 the taker 110 may use the resource 130 as it normally would. Subsequently, in step 260, the taker 110 sets the status 122 of the spinlock 120 to FREE and the method 200 terminates. In other exemplary embodiments, step 255 may not be performed, e.g., after performing fault recovery, the taker 110 may immediately set the status 122 to FREE, and may be required to initiate a new query to the spinlock 120 in order to subsequently gain access to the resource 130.

If, in step 215, the taker 110 determines that the status 122 of the spinlock 120 is FAULTED, then in step 265 it returns an error. In this manner if a taker is the first to discover a failure, it remedies the failure, as described above. If the taker discovers a failure that has been discovered previously by another taker, it may be made aware of the fact that the failure has been previously discovered by another taker, and that the failure is already being remedied, due to the fact that the status 122 has been changed to FAULTED as described above with reference to step 245. After step 265, the method terminates.

Figure 3:
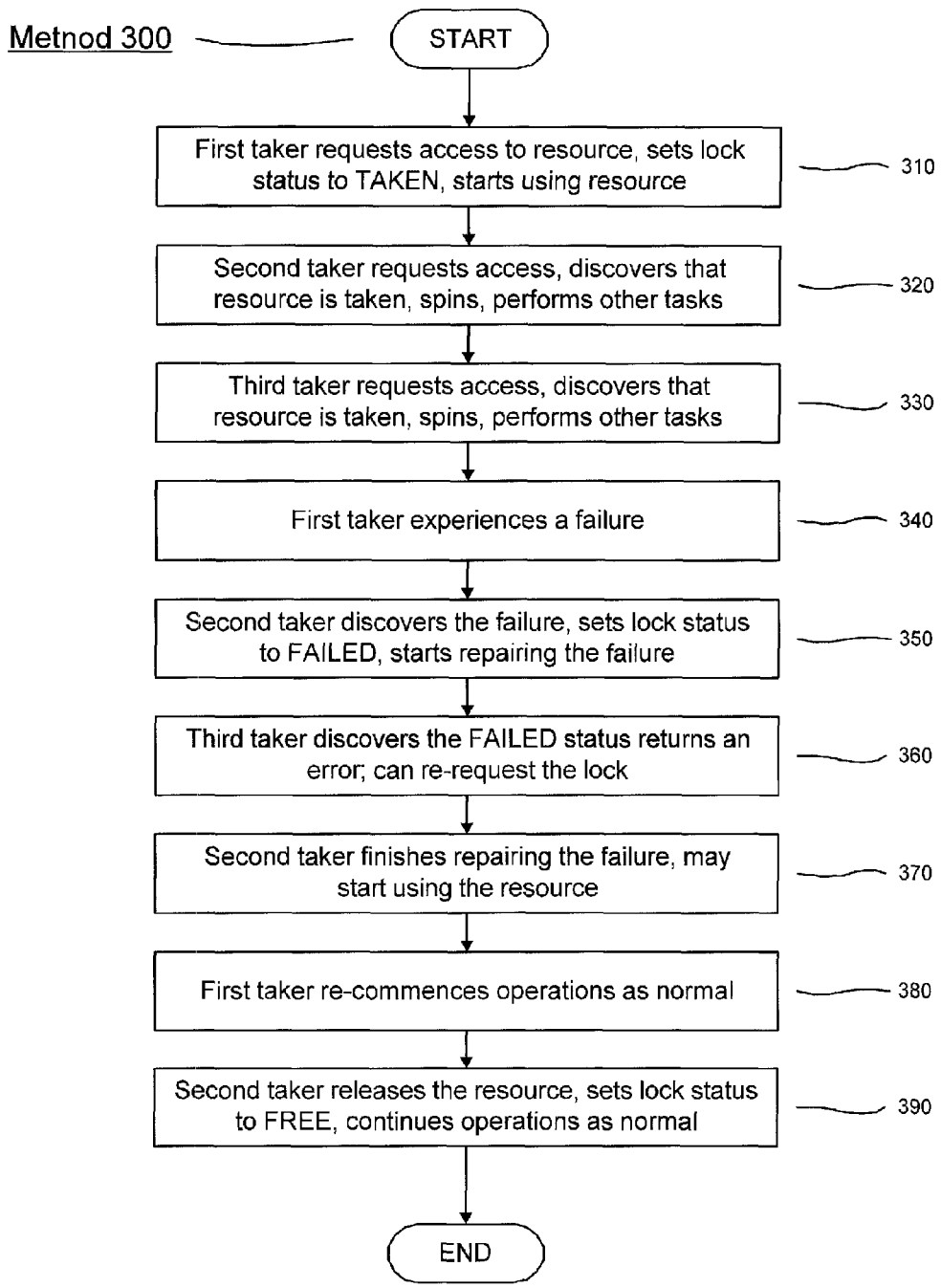
FIG. 3 shows an exemplary method by which a fault recovery involving multiple takers may proceed.

FIG. 3 illustrates an exemplary method 300 by which multiple takers, each operating in accordance with the exemplary method 200, may attempt to access a locked resource. As for the method 200, the method 300 will be described with reference to the elements of the exemplary system 100.

At the outset of the method 300, the resource 130 is not allocated to a taker and the status 122 is FREE. In step 310, a first taker 110 requests and is granted access to the resource 130 according to steps 210, 215, 220 and 225 of method 200. In step 320, a second taker 112 requests access to the resource 130, and discovers that the status 122 is TAKEN by taker 110, but that the timer 124 is not expired. Thus, the second taker 112 may perform other tasks in the interim. Step 320 thus proceeds according to steps 210, 215 and 235 and 240 of method 200. In step 330, a third taker 114 also requests access to the resource 130 and proceeds substantially identically to the second taker 112 in step 320.

In step 340, the first taker 110 experiences a failure, as described above. In step 350, the second taker 112, proceeding again through steps 215 and 235 of method 200, discovers that the status 122 remains TAKEN, but that the timer 124 is expired. Thus, the second taker 112 changes the status 124 to FAULTED and initiates recovery of the fault, as described above with reference to steps 245 and 250. In step 360, the third taker 114, repeating step 215, discovers that the lock status 122 has changed to FAULTED and proceeds to step 265, where the third taker 114 returns an error. Thus, it will be apparent that when one taker (e.g., taker 112) has initiated recovery from a failure, subsequent takers (e.g., taker 114) will not attempt to do the same, but will be aware that recovery has begun. At this point, the third taker 114 may subsequently make a new request to spinlock 120 (e.g., restart method 200) at an appropriate point.

In step 370, the second taker 112 finishes remedying the failure and takes access to the resource 130 according to steps 250 and 255 of method 200. In step 380, the first taker 110 may re-initiate its operations under normal procedures, and may subsequently make a new request to spinlock 120 (e.g., restart method 200) at an appropriate point. Finally, in step 390, the second taker 112 releases the resource 130 and sets the status 122 to FREE.

The following represents an exemplary algorithm that may encapsulate the techniques described above:

```
while (TRUE)
{
   currentState = atomicGet (lock -> state);
   newState = ((currentState->iterCnt + 1) | nodeId);
   if(atomicCas (lock->state, LOCK_NOT_TAKEN, newState));
      {
         return (OK);
      }
   timeLimitStart = getStartTime( );
   while (atomicGet(lock->state == currentState)
      {
         if((getCurrentTime( ) – timeLimitStart)>
         lock->timeLimit)
            {
               if(atomicCas(lock->state,currentState,newState))
                  {
                     return(FORCE_TAKE)
                  }
            }
      }
}
```

Thus, the exemplary embodiments may provide a mechanism by which failures by takers of spinlocks may be detected. The exemplary embodiments may further enable a single subsequent taker to be selected to remedy such failures. Finally, the exemplary embodiments may provide a mechanism by which failures may be remedied and by which a spinlock and its resource may thereby be returned to normal operation.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
   requesting access to a resource governed by a spinlock;
   determining an allocation of the resource to a further requester;
   determining an expiration of a time limit for the spinlock, if the resource is allocated to the further requester; and
   initiating a fault recovery, if the time limit is expired, the initiating of the fault recovery comprising changing a status of the spinlock from a TAKEN status to a FAULTED status.

2. The method of claim 1, further comprising:
   accessing the resource, if the resource is unallocated.

3. The method of claim 2, wherein the accessing of the resource comprises changing a status of the spinlock from a FREE status to the TAKEN status.

4. The method of claim 1, wherein the determining of the allocation of the resource comprises determining a status of the spinlock.

5. The method of claim 4, wherein the resource is determined to be allocated to the further requester if the status of the spinlock is the TAKEN status, and wherein the resource is determined not to be allocated to the further requester if the status of the spinlock is a FREE status.

6. A method, comprising:
   requesting access to a resource governed by a spinlock;
   determining an allocation of the resource to a further requester;
   determining an expiration of a time limit for the spinlock if the resource is allocated to the further requester;
   initiating a fault recovery, if the time limit is expired; and
   returning an error, if a status of the spinlock is a FAULTED status.

7. A system, comprising:
   a resource;
   a spinlock governing access to the resource; and
   a plurality of takers for accessing the resource,
   wherein, when a first taker requests access to the resource, the first taker:
      determines whether a second taker is using the resource;
      determines, if the second taker is using the resource, whether a time limit relating to the spinlock has been exceeded; and
      initiates a fault recovery, if the time limit has been exceeded, the initiating of the fault recovery comprising changing a status of the spinlock from a TAKEN status to a FAULTED status.

8. The system of claim 7, wherein the first taker accesses the resource, if the second taker is not using the resource.

9. The system of claim 8, wherein the accessing of the resource comprises changing a status of the spinlock from a FREE status to the TAKEN status.

10. The system of claim 7, wherein the determining of whether the second taker is using the resource comprises determining a status of the spinlock.

11. The system of claim 10, wherein the first taker determines that the second taker is using the resource if the status of the spinlock is the TAKEN status, and wherein the first taker determines that the second taker is not using the resource if the status of the spinlock is a FREE status.

12. A system, comprising:
   a resource;
   a spinlock governing access to the resource; and
   a plurality of takers for accessing the resource,
   wherein, when a first taker requests access to the resource, the first taker:
      determines whether a second taker is using the resource;
      determines, if the second taker is using the resource, whether a time limit relating to the spinlock has been exceeded;
      initiates a fault recovery, if the time limit has been exceeded; and
      returns an error if a status of the spinlock is a FAULTED status.

13. A non-transitory computer-readable storage medium storing a set of instructions executable by a processor, the set of instructions, when executed, causing the processor to:
   request access to a resource governed by a spinlock;
   determine an allocation of the resource to a further requester;
   determine an expiration of a time limit for the spinlock, if the resource is allocated to the further requester; and
   initiate a fault recovery, if the time limit is expired, the initiating of the fault recovery comprising changing a status of the spinlock from a TAKEN status to a FAULTED status.

14. The non-transitory computer-readable storage medium of claim 13, wherein the set of instructions is further cause the processor to:
   access the resource, if the resource is unallocated.

15. The non-transitory computer-readable storage medium of claim 14, wherein the accessing of the resource comprises changing a status of the spinlock from a FREE status to the TAKEN status.

16. The non-transitory computer-readable storage medium of claim 13, wherein the determining of the allocation of the resource comprises determining a status of the spinlock.

17. The non-transitory computer-readable storage medium of claim 16, wherein the resource is determined to be allocated to the further requester if the status of the spinlock is the TAKEN status, and wherein the resource is determined not to be allocated to the further requester if the status of the spinlock is a FREE status.

18. A non-transitory computer-readable storage medium storing a set of instructions executable by a processor, the set of instructions, when executed, causing the processor to:
   request access to a resource governed by a spinlock;
   determine an allocation of the resource to a further requester;
   determine an expiration of a time limit for the spinlock, if the resource is allocated to the further requester;
   initiate a fault recovery, if the time limit is expired; and
   return an error, if a status of the spinlock is FAULTED.

* * * * *